United States Patent [19]

Arold et al.

[11] Patent Number: 4,693,417
[45] Date of Patent: Sep. 15, 1987

[54] HEATING OR AIR-CONDITIONING SYSTEM FOR VEHICLES

[75] Inventors: Klaus Arold; Heinz Koukal, both of Sindelfingen; Hermann Grimm, deceased, late of Ostelsheim, by Christel Grimm, executrix; Hans Trube, Herrenberg, all of Fed. Rep. of Germany

[73] Assignee: Daimler-Benz Aktiengesellschaft, Fed. Rep. of Germany

[21] Appl. No.: 871,893

[22] Filed: Jun. 9, 1986

[30] Foreign Application Priority Data

Jun. 7, 1985 [DE] Fed. Rep. of Germany ....... 3520553

[51] Int. Cl.[4] .............................................. B60H 1/02
[52] U.S. Cl. .......................... 237/12.3 B; 237/12.3 A
[58] Field of Search ..................... 237/12.3 B, 12.3 A, 237/12.3 R, 28, 35, 34, 36, 45

[56] References Cited

U.S. PATENT DOCUMENTS 1,991,990  2/1935  Van Vulpen et al. ......... 237/12.3 B
4,300,720  11/1981  Baier et al. .................... 237/12.3 A Primary Examiner—Henry A. Bennet

[57] ABSTRACT

A heating or air-conditioning system for passenger cars is described that is equipped with a main heat exchanger comprising a ribbed-tube block against which the air flows that is guided into the passenger space and of a forward-flow radiator tank through which water flows and a return-flow radiator tank. The heating or air-conditioning system is also equipped with one or several additional panel radiators that are connected to an additional circulating system and are arranged so that they are distributed at or in the interior of the vehicle. This additional circulating system has a forward-flow chamber that is assigned to the return-flow radiator tank of the main heat exchanger. As a result, the advantage is achieved that the panel radiators, during the heating operation, can be acted upon directly from the main heat exchanger by a lower temperature. Also, the advantage is achieved that the panel heat exchangers in the cooling operation of the air-conditioning system, may also be used for cooling.

14 Claims, 3 Drawing Figures

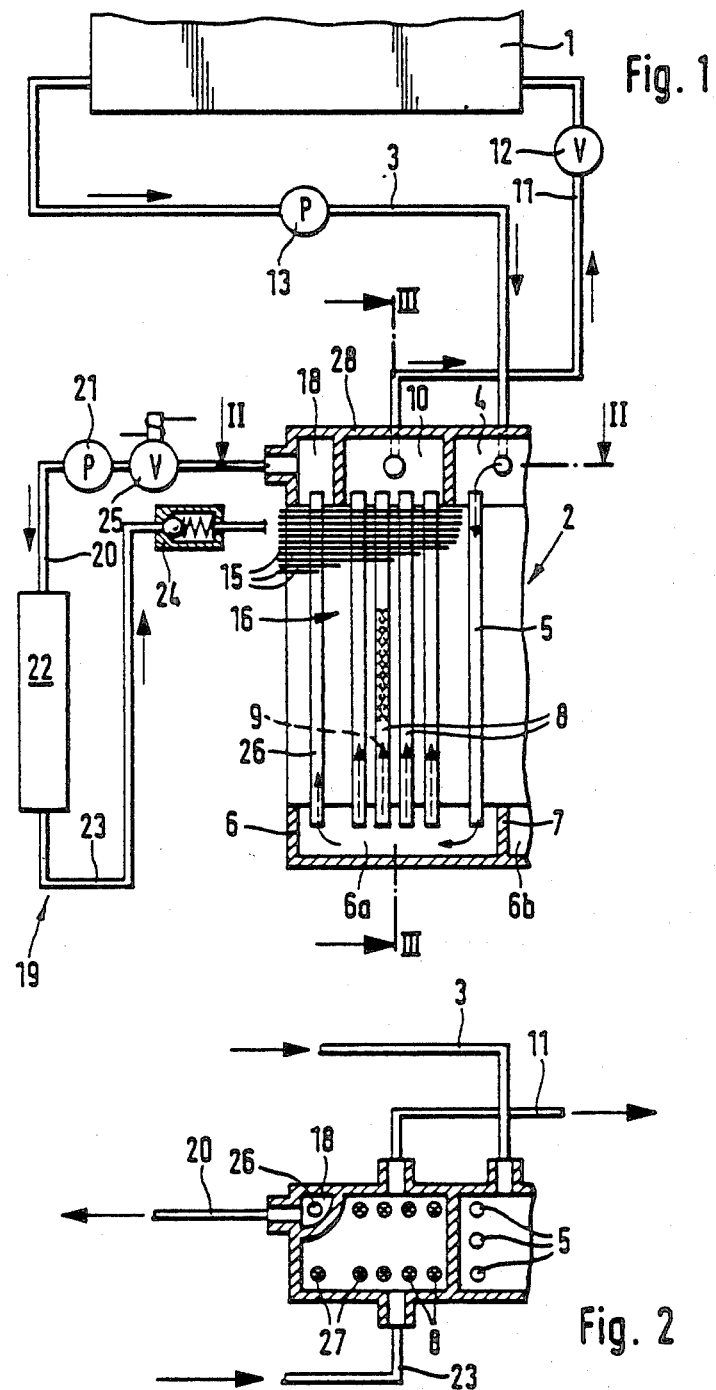

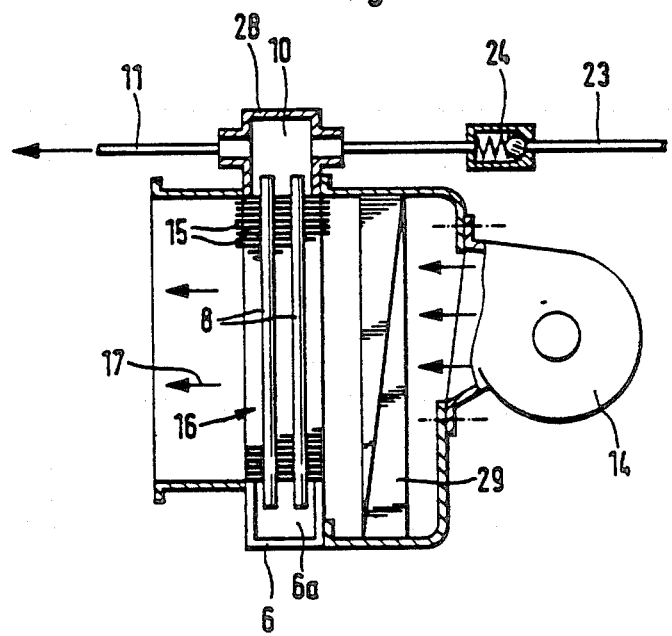

HEATING OR AIR-CONDITIONING SYSTEM FOR VEHICLES

BACKGROUND AND SUMMARY OF THE INVENTION

This invention relates to a heating or air-conditioning system for vehicles, particularly passenger cars, having a main heat exchanger consisting of a block of ribbed tubes against which the air flows that is guided into the passenger space and of a forward-flow radiator or tank through which the water flows and a return-flow radiator tank, as well as having one or several additional panel radiators that are connected to an additional circulating system and are arranged so that they are distributed at or in the inside of the interior of the vehicle.

Heating or air-conditioning systems of this type are known. In this case, the additional panel heat exchangers are, for example, arranged below the windshield or also under the seats and via an additional circulating system may be connected at the forward or inlet flow for the main heat exchanger. The disadvantage in the case of such systems is that the additional heating circulating system is fed with the hot forward-flow water so that special precautions must be taken to cause the additional panel heat exchangers to take on the temperature that is desired in each case. The arrangement of such additional heat exchangers is therefore relatively costly.

This invention is based on the objective of remedying this condition.

This invention is based on the recognition that, because of the lower temperatures of the heat exchange medium that are required as a rule, it is advantageous to admit to the additional heating circulating system the colder return flow of the main heat exchanger. With respect to details, the invention, in the case of a system of the initially mentioned type, consists of the fact that a forward-flow chamber for the additional circulating system is assigned to the return-flow radiator tank of the main heat exchanger. By means of this development, the supply of the additional heating circulating system can take place directly from the main heat exchanger without requiring additional separate control elements between the additional panel heat exchangers and their forward flow. In the case of air-conditioning systems, in which an evaporator is mounted in front of the main heat exchanger, said evaporator cooling the air that flows through the main heat exchanger and into the vehicle, the main heat exchanger, based on the development according to the invention, can serve as a cooling device for the fluid flowing through the additional circulating system so that in the cooling operation, the additional panel heat exchangers may also be utilized for the cooling of the interior of the vehicle which had not been possible previously.

Especially preferred embodiments include further advantageous features. Certain embodiments include different flow resistance tubes through the main heat exchanger block of ribbed tubes for the respective auxiliary and main heat exchanger circuit resulting in the advantage that a compact construction is possible for the heating or air-conditioning system despite the arrangement of an additional circulating system and therefore the previously customary construction of the main heat exchanger can be maintained. In certain preferred embodiments a separately controllable pump is provided in the auxiliary circulating system, a feature which makes possible a simple operation of the additional circulating system in the cooling operation, in which the heated cooling water does not flow through the main heat exchanger from the direction of the engine. In the case of a leakage in a component of the additional circulating system, the provision in certain embodiments of a blocking valve in the inlet to the auxiliary circulatory system which is controllable as a function of the water level in the main circulating system prevents that the cooling water level in the engine assumes a value that could endanger engine operation. The provision in certain embodimen of a one way valve in the auxiliary circuit return line ensures that the additional circulating system is not affected disadvantageously by the pressure conditions that may occur in the main heat exchanger.

Further objects, features, and advantages of the present invention will become more apparent from the following description when taken with the accompanying drawing(s) which show, for purposes of illustration only, an embodiment/several embodiments in accordance with the present invention.

BRIEF DESCRIPTION OF THE DRAWINGS

FIG. 1 is a diagrammatic representation of an air-conditioning system of a passenger car having a main heat exchanger fed by the engine cooling water for the heating and having an evaporator for the cooling operation with a connected circulating system for the panel heat exchanger, with the main heat exchanger shown partially, constructed in accordance with a preferred embodiment of the invention;

FIG. 2 is a section through the main heat exchanger of FIG. 1 along Line II/II; and FIG. 3 is a diagrammatic section through the air-conditioning system along Line III/III in FIG. 1.

DETAILED DESCRIPTION OF THE DRAWINGS

In the figures, a water-circulating system for a vehicle heater that is equipped with a main heat exchanger 2 is connected in parallel to the cooling-water circulating system of an engine 1, the hot cooling water coming from the engine 1 in the case of said water-circulating system, via forward-flow pipe 3, being guided into an inflow chamber 4 of the main heat exchanger 2. In the case of the shown embodiment of the main heat exchanger, the hot cooling water fed to the inflow chamber 4, in the heating operation is led through pipes 5 to the actual forward or inlet flow radiator tank 6 of the main heat exchanger 2. In the illustrated embodiment, tank 6 is divided by means of partition 7 into two chambers 6a and 6b, from which the hot cooling water can in each case be guided into a left and into a right heat exchanger part, with the aid of which—in a known manner—the heating for the driver and the front-seat passenger can be controlled separately. Since the remaining construction of the right and the left heat exchanger part is identical, in the following, only the left half will be described to which the forward-flow chamber 6a is assigned. Naturally it is also possible to provide a heating and air-conditioning system according to the invention when the main heat exchanger 2 is not equipped with two separate heat exchanger halves.

From the forward-flow chamber 6a, the hot cooling water through the pipes 8 in the direction of the Arrows 9 moves upward into the return-flow chamber 10 of the main heat exchanger 2 and from there, through the return-flow pipe 11, via a timing valve 12, is returned to the engine 1. The circulating via the forward-flow pipe 3, the main heat exchanger 2 and the return-flow pipe 11 can be maintained by means of the cooling-water pump of the engine. Its function is diagrammatically indicated by the pump 13 assigned to the forward-flow pipe 3. The timing valve 12 controls the water volume circulating in the circulating system 3, 2, 11 according to the desired heating effect. The fresh air that is sucked in from the outside by a fan 14 (see FIG. 3) flows through the the block of ribbed tubes formed by the tubes 8 and the ribs 15 surrounding them and is guided into the interior of the vehicle in the direction of the Arrows 17.

A forward-flow chamber 18 for an additional heating circulating system 19 is assigned to the return-flow chamber 10 of the main heat exchanger 2, the forward-flow pipe 20 of said additional heating circulating system 19 originating from the forward-flow chamber 18. This forward-flow pipe 20 is equipped with a pump 21 that leads the cooling water—of a lower temperature than in the forward-flow pipe 3—taken from the forward-flow chamber 18 to one or several panel heat exchangers 22 which may, for example, be arranged in the vehicle in the area of the arm rests, under the seats, or also at the windshield or the side windows. After flowing through the panel heat exchangers 22, the cooling water, via the return-flow pipe 23 of the additional heating circulating system 19 and via a return valve 24, reaches the return-flow chamber 10 of the main heat exchanger, from where, via the return-flow pipe 11, it is returned to the engine. In the forward-flow pipe 20 of the additional heating circulating system 19, a stop valve 25 is also arranged that, in a way that is not shown in detail, is connected with a water-level sensor at the engine and prevents the flowing of cooling water from the forward-flow chamber 18 into the additional heating circulating system 19 when the cooling-water level in the engine falls below a certain value. As a result, it can be prevented that, for example, in the case of a leakage of a panel heat exchanger 22 or of its feeding pipes, the water level in the cooling system of the engine falls below a value that represents a danger during the operation of the engine.

The cooling water that is located in the forward-flow chamber 6a in the main heat exchanger 2 and is partially already cooled by the guiding in the tubes 5, from the forward-flow chamber 6a reaches the forward-flow chamber 18 of the additional heating circulating system 19 via one or several tubes 26 that are not, like the tubes 8, equipped with the customary turbulence inserts 27 for increasing the heat transfer to the tube walls. As a result, when the tubes 8 or 26 and 5 are dimensioned correspondingly, there is always a sufficient supply to the additional heating circulating system 19 with the heating medium. The return-flow radiator tank 28 of the main heat exchanger 2, based on this development, is at the same time used for supplying the additional heating circulating system 19.

This development therefore makes it possible to not only, as in the case of the known embodiments, supply the interior of the vehicle with preheated air via the heating and air-conditioning system and heat the panel heat exchangers but also to use the whole system for the cooling operation. The reason is that the air-conditioning unit, as shown in FIG. 3, between the fan 14 and the block 16 of ribbed tubes belonging to the main heat exchanger 2, is equipped with an evaporator 29 that, in a way that is not shown in detail, is part of a cooling system assigned to the air-conditioning system. When therefore, in the cooling operation of the air-conditioning system, in a known manner, the heating circulating system is switched off by the closing of the timing valve 12, the fresh air sucked in by the fan 14 can be cooled when it flows through the evaporator 29 that is developed in a known way, and in the cooled state, after flowing through the block 16 of ribbed tubes, enters into the interior of the vehicle in the direction of the Arrows 17. The air-conditioning system shown in these figures, in this operating condition, may also be utilized for using the panel heat exchanger 22 for the cooling of the interior of the vehicle. For this purpose, the pump 21 delivers the cooling water contained in the main heat exchanger 2 exclusively through the additional circulating system 19; a return flow to the engine is prevented by the closing of the timing valve 12. The air that is cooled by the evaporator 29 therefore, when it flows through the block 16 of ribbed tubes, also cools the heat exchange medium circulated in the additional circulating system 19 so that the whole system in this operating condition can be utilized not only for the cooling of fresh air, that is delivered into the inside of the vehicle by the fan 14, but also for the cooling of additional panel heat exchangers, without requiring any principal change of existing air-conditioning systems.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A vehicle heating or air-conditioning system comprising:

main heat exchanger means having forward flow tank means and return flow tank means connected to return cooled water to an engine, said tank means being connected to one another by a plurality of parallel flowing ribbed connecting tubes against which air flows that is guided into a vehicle passenger space, and auxiliary heat exchanger means having auxiliary panel radiator means arranged in the vehicle interior, said panel radiator means being supplied by fluid heat medium from an auxiliary heat supply portion of the return flow tank means of the main heat exchanger means.

2. A system according to claim 1, wherein said auxiliary heat exchanger means includes auxiliary return flow means connecting the panel radiator means with the return flow tank means of the main heat exchanger means at a position separate from the auxiliary heat exchanger supply portion of the return flow tank means.

3. A vehicle heating or air-conditioning system comprising:

main heat exchanger means having forward flow tank means and return flow tank means connected to one another by ribbed connecting tubes against which air flows that is guided into a vehicle passenger space, auxiliary heat exchanger means having auxiliary panel radiator means arranged in the vehicle interior, said panel radiator means being supplied by fluid heat medium from an auxiliary heat supply portion of the return flow tank means of the main heat exchanger means, said auxiliary heat exchanger means includes auxiliary return flow means connecting the panel radiator means with the return flow tank means of the main heat exchanger means at a position separate from the auxiliary heat exchanger supply portion of the return tank flow means, and wherein said auxiliary heat exchanger supply portion of the return flow tank means is separate from the remaining portions of the return flow tank means.

4. A system according to claim 3, wherein the ribbed connecting tubes include main tubes and auxiliary tubes the auxiliary tubes opening into the auxiliary heat exchanger supply portion of the return flow tank means and the main tubes opening into the remaining portion of the return flow means, and wherein the auxiliary tubes are provided with less flow resistance than the main tubes.

5. A system according to claim 4, wherein the main and auxiliary tubes have the same diameter, and wherein the main tubes have turbulence inducing inserts and the auxiliary tubes have no turbulence inserts.

6. A system according to claim 1, wherein said auxiliary heat exchanger means includes an auxiliary pump which controls the supplied fluid heat medium independently of the main heat exchanger means.

7. A vehicle heating or air-conditioning system comprising:
main heat exchanger means having forward flow tank means and return flow tank means connected to one another by ribbed connecting tubes against which air flows that is guided into a vehicle passenger space,
auxiliary heat exchanger means having auxiliary panel radiator means arranged in the vehicle interior, said panel radiator means being supplied by fluid heat medium from an auxiliary heat supply portion of the return flow tank means of the main heat exchanger means, and
wherein said auxiliary heat exchanger means includes stop valve means interposed upstream of the panel radiator means, said stop valve means being controllable as a function of the fluid medium level in the main heat exchanger means.

8. A system according to claim 7, wherein said auxiliary heat exchanger means includes an auxiliary pump which is controllable independently of the main heat exchanger means, and wherein said stop valve means is interposed between the auxiliary pump and the return flow tank means of the main heat exchanger means.

9. A system according to claim 1, wherein said auxiliary heat exchanger means includes a return flow line leading to the return flow tank means of the main heat exchanger means, and wherein a one way return flow valve is disposed in the return flow line.

10. A system according to claim 7, wherein said auxiliary heat exchanger means includes a return flow line leading to the return flow tank means of the main heat exchanger means, and wherein a one way return flow valve is disposed in the return flow line.

11. A system according to claim 10, wherein said auxiliary heat exchanger means includes an auxiliary pump which is controllable independently of the main heat exchanger means, and wherein said stop valve means is interposed between the auxiliary pump and the return flow tank means of the main heat exchanger means.

12. A system according to claim 4, wherein said auxiliary heat exchanger means includes an auxiliary pump which is controllable independently of the main heat exchanger means.

13. A system according to claim 1, wherein said main heat exchanger means includes return flow line means leading from the return flow tank means to a vehicle engine to be cooled,
forward flow line means leading to the forward flow tank means,
timing valve means interposed in the return flow line means to control flow of fluid medium to the engine, and
main pump means interposed in the forward flow line means for pumping fluid medium as cooling medium through the engine.

14. A system according to claim 13, further comprising selectively operable air conditioner evaporator means disposed in the air flow upstream of the ribbed connecting tubes, said evaporator means being operable with a control of the engine cooling fluid medium flow to serve to apply cooling effects to the fluid medium supplied to the auxiliary heat exchanger panel radiator means.

* * * * *